United States Patent
Takago et al.

[11] Patent Number: 5,239,034
[45] Date of Patent: Aug. 24, 1993

[54] HIGH-STRENGTH SILICON RUBBER COMPOSITIONS

[75] Inventors: Toshio Takago; Hitoshi Kinami, both of Annaka; Hiroshi Inomata, Takasaki; Shinichi Sato; Hirokazu Yamada, both of Annaka, all of Japan

[73] Assignee: Shin-Etsu Chemical Co., Ltd., Tokyo, Japan

[21] Appl. No.: 739,428

[22] Filed: Aug. 2, 1991

[30] Foreign Application Priority Data

Aug. 3, 1990 [JP] Japan ................. 2-206530

[51] Int. Cl.$^5$ ............................. C08G 77/06
[52] U.S. Cl. ........................... 528/15; 528/35; 528/31; 525/478
[58] Field of Search ................ 528/15, 35, 31; 525/478

[56] References Cited

U.S. PATENT DOCUMENTS 3,294,740 12/1966 McVannel .
3,997,497 12/1976 Itoh et al. .
4,208,506  6/1980 Deichert et al. .
4,886,865 12/1989 Ikeno et al. .

Primary Examiner—Melvyn I. Marquis
Attorney, Agent, or Firm—Oblon, Spivak, McClelland, Maier & Neustadt

[57] ABSTRACT

Silicone rubber compositions, of the addition curable type, comprise as a base polymer a vinyl-containing organopolysiloxane having a tetraorganosilethylenesiloxane unit of the following general formula:

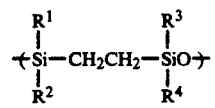

wherein $R^1$ to $R^4$ are each a monovalent hydrocarbon group of from 1 to 10 carbon atoms. The silicone rubber composition gives a cured product having high strength, for example, a tensile strength of 30 kg/cm$^2$ or above, without compounding fillers or reinforcing agents.

5 Claims, No Drawings

HIGH-STRENGTH SILICON RUBBER COMPOSITIONS

BACKGROUND OF THE INVENTION

1. Field of the Invention

The present invention relates to an additioncurable type silicone rubber composition and a cured product of the same. More particularly, the invention relates to a silicone rubber composition capable of giving a cured product in the form of a high-strength elastomeric gum rubber, with no reinforcing agents compounded therein, and to a cured product of the same.

2. Description of the Prior Art

Silicone rubbers have excellent heat resistance, cold resistance, mold release property, weatherability, etc. and are widely used in a variety of fields. The silicone rubbers are of the type in which a silicone polymer as a main constituent is cured by use of a peroxide or by a condensation reaction, addition reaction or the like. When used singly, however, the silicone polymer can only give cured products with a tensile strength on the order of a few kg/cm$^2$. Therefore, a reinforcing agent or filler, such as particulate silica, is generally compounded in silicone rubbers to obtain a tensile strength ranging from several tens to 140 kg/cm$^2$.

However, the addition of a reinforcing agent to a silicone rubber composition causes the problem that the composition before cure has an excessively high viscosity and hence a lowered fluidity, namely, lowered workability or that the cured product of the composition shows a lowered transparency.

SUMMARY OF THE INVENTION

Accordingly, it is an object of the present invention to provide a silicone rubber composition capable of forming a high-strength cured rubber product, with no addition of reinforcing agent or filler.

The above object is successfully attained according to the present invention by using, as a base polymer, a siloxane polymer having a tetraorganosilethylenesiloxane unit and containing an unsaturated aliphatic group.

According to the present invention, there is provided a silicone rubber composition comprising:

(A) an organopolysiloxane which has a structural unit having the following general formula [I]:

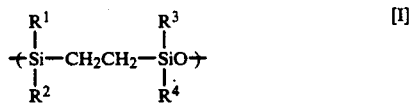

wherein R$^1$ to R$^4$ may be the same or different from each other and are each a substituted or unsubstituted monovalent hydrocarbon group of from 1 to 10 carbon atoms, and contains an unsaturated aliphatic group;

(B) an organohydrogenpolysiloxane having at least two Si—H groups in its molecule; and (C) a platinum family metal catalyst.

The silicone rubber composition of the present invention is capable of forming an elastomeric gum rubber which has high strength, for example, a tensile strength of 30 kg/cm$^2$ or above, without compounding reinforcing agents or fillers. Consequently, it has become possible to obtain an elastomeric gum rubber which is high in strength and transparent. Furthermore, as is apparent from the experimental results hereinbelow, cured products formed from the composition of the present invention have high volume resistance and exhibit excellent performance when used as electrical insulating material.

DETAILED DESCRIPTION OF THE INVENTION

(A) Organopolysiloxane

In the present invention, the organopolysiloxane used as the base polymer contains a tetraorganosilethylenesiloxane unit having the aforementioned general formula [I], as a structural unit thereof. In the formula [I], the groups R$^1$ to R$^4$ include, for example, lower alkyl groups of up to 10 carbon atoms such as methyl, ethyl, propyl, butyl, etc.; cycloalkyl groups such as cyclohexyl, etc.; alkenyl groups such as vinyl, allyl, propenyl, butenyl, etc.; aryl groups such as phenyl, tolyl, naphthyl, etc.; aralkyl groups such as benzyl, 2-phenylethyl, etc.; and groups derived from these groups by substitution of halogen atoms for part or the whole of the hydrogen atoms in these groups, examples of the derived groups including unsubstituted or substituted monovalent hydrocarbon groups of generally from 1 to 10 carbon atoms, preferably from 1 to 8 carbon atoms, such as chloromethyl, trifluoropropyl, etc.

In the composition of the present invention, the tetraorganosilethylenesiloxane unit (hereinafter referred to simply as "silethylenesiloxane unit") is preferably present in an amount of 50 mol % or above, more preferably 70 mol % or above, based on the total amount of all siloxane units in the composition. When an organopolysiloxane having a lower silethylenesiloxane unit content is used, the resultant cured product has a lowered strength and it is difficult to attain the object of the present invention.

The organopolysiloxane (A) used in the present invention has an unsaturated aliphatic group, as well as the silethylenesiloxane unit. The unsaturated aliphatic group serves as a crosslinking functional group for performing an addition reaction with the Si—H groups in the organohydrogenpolysiloxane, which will be described below, to form an addition-cured product in the form of an elastomeric gum rubber. The unsaturated aliphatic groups which can be used include, for example, alkenyl groups of from 2 to 6 carbon atoms, such as vinyl, allyl, propenyl, butenyl, etc., of which preferred is the vinyl. The unsaturated aliphatic group may be contained in the silethylenesiloxane unit or in other siloxane unit. In general, the amount of such unsaturated aliphatic groups is preferably 0.5 mole or below, more preferably from 0.0002 to 0.1 mole, per 100 g of the organopolysiloxane (A). If the amount of the unsaturated aliphatic groups is too large, the elongation of the resulting cured product may be lowered due to an excessively raised crosslink density. When the amount is too small, on the other hand, the crosslink density obtained may be so low that the cured product shows a lowered rubber strength.

As the organopolysiloxane (A) for use in the present invention, a wide range of organopolysiloxanes can be used, from those having a low viscosity of several tens of centistokes (cSt) at 25° C. to solid rubber gum-like high molecular weight polymers, depending on the rubber product intended. For example, rubber gum-like polymers are suited to heat-curable rubber, whereas polymers having a viscosity of from about 100 to about 100,000 cSt (25° C.) are suited to liquid rubber. If a polymer with an excessively low viscosity is used, the resulting elastomer may show a reduced elongation, failing to exhibit good balance of properties.

Preferred examples of the organopolysiloxane (A) are given below. In the following formulas, m, n, l and p are each a positive integer, Ph stands for the phenyl group, and Y for the paraphenylene group.

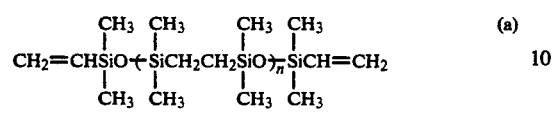
(a)

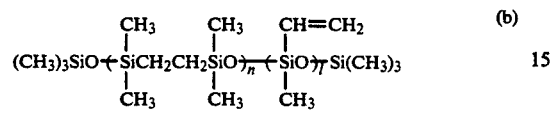
(b)

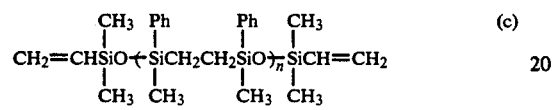
(c)

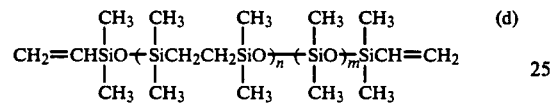
(d)

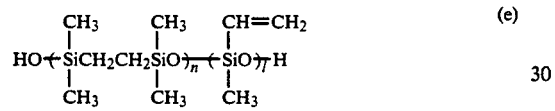
(e)

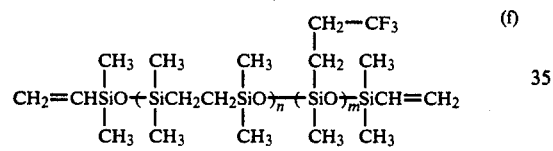
(f)

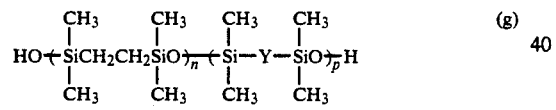
(g)

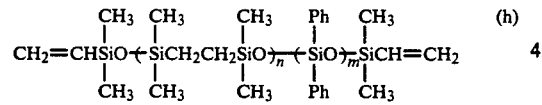
(h)

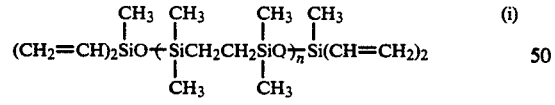
(i)

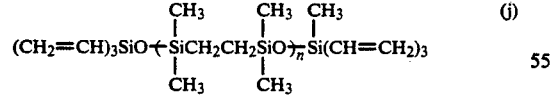
(j)

Preparation of the above organopolysiloxanes will now be explained, taking the organopolysiloxane (a) as an example. The organopolysiloxane (a) can be prepared according to the following path of synthesis:

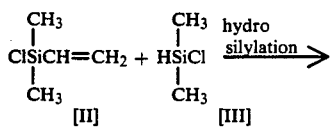

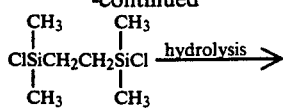

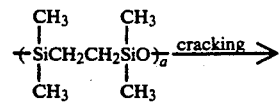

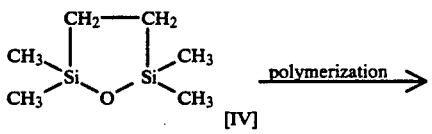

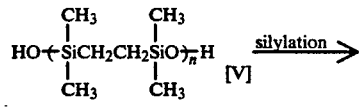

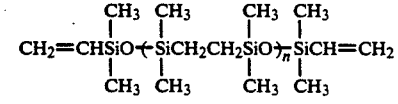

As will be readily understood from the above synthesis path, organopolysiloxanes having organic groups different from those of the organopolysiloxane (a) can be obtained by replacing the methyl groups in the starting materials [II] and [III] by other organic groups.

Besides, by copolymerizing the aforementioned intermediate [V] with a cyclotrisiloxane such as:

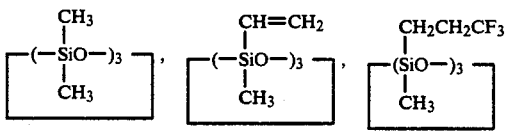

etc., it is possible to synthesize a variety of silethylenesiloxane-containing polymers. Furthermore, reactions of the aforementioned intermediate [V] with various silylating agents enable introduction of not only the group:

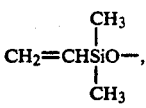

but other groups such as:

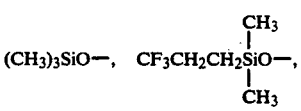

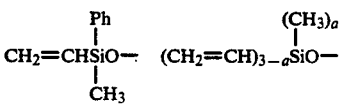

(where a is 0 or 1) etc. to molecular ends of the organopolysiloxanes. The applicable silylating agents for such purpose include, for example, those having the following formula:

(R⁵)₃SiX wherein R⁵ is a substituted or unsubstituted monovalent hydrocarbon group, X is a halogen, —NCO, $$-\underset{\underset{CH_3}{|}}{O}C=CH_2, \quad -\underset{\underset{OR^6}{|}}{O}C=CH_2, \quad -CH_2\overset{\overset{O}{\|}}{C}-OR^6$$

(wherein R⁶ is a monovalent hydrocarbon group) or the like, and those having the following formula:

[(R⁵)₃Si]₂NH wherein R⁵ is as defined above. Of these silylating agents, preferred are $$[(R^5)_3Si]_2NH, \quad (R^5)_3SiO\underset{\underset{OR^6}{|}}{C}=CH_2, \quad (R^5)_3SiCH_2\overset{\overset{O}{\|}}{C}-OR^6$$

and so on.

In this manner, not only the organopolysiloxane (a) but other organopolysiloxanes, such as (b) to (j), can be synthesized.

(B) Organohydrogenpolysiloxane

In the composition of the present invention, an organohydrogenpolysiloxane having at least two Si—H groups in its molecule is used, as a crosslinking agent, together with the aforementioned organopolysiloxane. The Si—H groups perform an addition reaction with the unsaturated aliphatic group contained in the organopolysiloxane (A), to form a cured product in the form of an elastomeric gum rubber.

The organohydrogenpolysiloxane may take any of linear, cyclic, branched and network molecular structures, as long as it has at least two Si—H groups in its molecule. Further, the organohydrogenpolysiloxane may have a low or a high molecular weight. In general, however, organohydrogenpolysiloxanes with a comparatively low molecular weight of 30,000 or below are used preferably, in view of ease of preparation. Preferred examples of the organohydrogenpolysiloxane include the following:

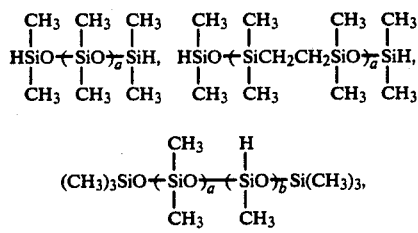

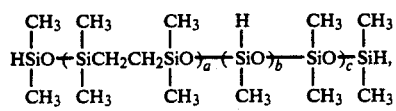

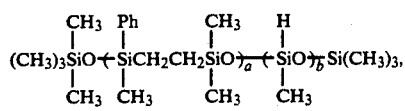

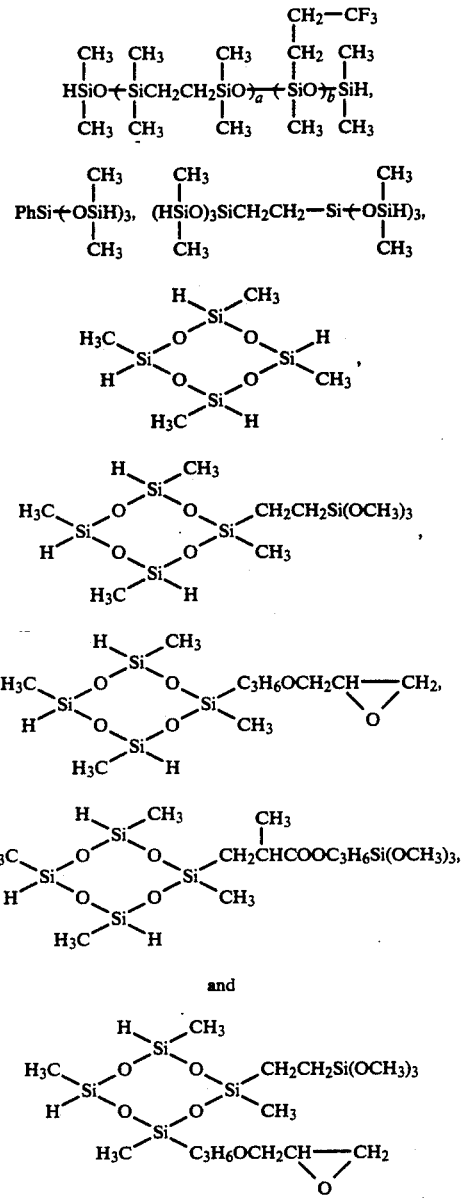

wherein a and b are each a positive integer.

The organohydrogenpolysiloxanes can be synthesized, for example, by an equilibration reaction of $$(HSi)_2O \text{ with } \begin{array}{c} CH_3 \\ | \\ -(SiO-)_4 \\ | \\ CH_3 \end{array} \text{ and } \begin{array}{c} CH_3 \\ | \\ -(-SiO-)_e \\ | \\ CH_3 \end{array}$$

wherein e is an integer of from 3 to 8, in the presence of an acid catalyst such as sulfuric acid, or by a cohydrolysis reaction of silanes and siloxanes having a hydrolyzable atom or group such as chlorine or alkokyl groups and corresponding to an aimed molecular structure.

In the composition of the present invention, the organohydrogenpolysiloxane is generally used in an amount of from 0.1 to 50 parts by weight per 100 parts by weight of the organopolysiloxane (A). A desirable amount of the organohydrogenpolysiloxane is such that the amount of the Si—H groups will be from 0.5 to 5 moles, more specifically from 1.2 to 3.0 moles, per mole of the total amount of the unsaturated aliphatic groups, such as vinyl, allyl, cycloalkenyl, etc. contained in the composition. When the amount of the organohydrogenpolysiloxane is too small, the degree of crosslinking attained will be insufficient. On the other hand, use of an excessively large amount of the organohydrogenpolysiloxane will cause foaming or lower the heat resistance, compression set characteristic or the like of the resultant cured product.

In order to obtain a uniform cured product of the composition, it is desirable to use, as the aforementioned organohydrogenpolysiloxane, one which is compatible with the organopolysiloxane of component (A).

(C) Platinum Family Metal Catalyst

According to the present invention, a platinum family metal catalyst is used together with the aforementioned components (A) and (B), in order to accelerate the addition reaction (hydrosilylation) between the two components.

As the platinum family metal catalyst, those used for conventional addition-curable type silicone rubber compositions can be used. The operable platinum family metal catalysts include, for example, chloroplatinic acid, complexes of chloroplatinic acid with olefins, such as ethylene, or with an alcohol or vinylsiloxane (Refer to U.S. Pat. Nos. 3,220,972 and 3,775,452); and solid catalysts comprising platinum supported on silica, alumina, carbon or the like. In addition to the platinum catalysts, there are other platinum family metal catalysts known, which are based on rhodium, ruthenium, iridium, palladium or the like. For example, $RhCl(PH_3)_3$, $RhCl(CO)(PPh_3)_2$, $Ru_3(CO)_{12}$, $IrCl(CO)(PPh_3)_2$, $Pd(PPh_3)_4$, and the like are also applicable. In order to obtain a uniform cured product, in general, chloroplatinic acid or a complex thereof is preferably used.

A preferred amount of the platinum family metal catalyst to be used is generally in the range from 1 to 1000 ppm, more specifically from 10 to 500 ppm.

Other Compounding Agents

If necessary, the composition of the present invention can further contain various other additives which are known per se.

For example, an organopolysiloxane having a resin structure comprising $SiO_2$ units, $CH_2=CH(R'_2)SiO_{0.5}$ units and $R'_3SiO_{0.5}$ units (wherein $R'$ is a monovalent hydrocarbon group containing no unsaturated aliphatic double bonds) (Refer to Japanese Patent Publication (KOKOKU) Nos. 38-26771 (1963) and 45-9476 (1970)) can be compounded in the composition, in order to enhance the strength of the elastomer obtained as a cured product of the composition. Also, a polysiloxane containing $CH_2=CHRSiO$ units (wherein R has the same meaning as the aforementioned groups $R^1$ to $R^4$) (Refer to Japanese Patent Publication (KOKOKU) No. 48-10947 (1973)), an acetylene compound (See U.S. Pat. No. 3,445,420 and Japanese Patent Publication (KOKOKU) No. 54-3774 (1979)), an ionic heavy metal compound (Refer to U.S. Pat. No. 3,532,649), etc. can be incorporated in the composition, for controlling the cure rate of the composition. Further, organopolysiloxanes with no functionality may be added in suitable amounts, for improvements in heat shock resistance, flexibility, etc. Even where these additives are compounded, it is desirable that the amount of the Si—H groups present in the composition be from 0.5 to 5 moles, preferably from 1.2 to 3.0 moles, per mole of the total amount of the silicon-bonded unsaturated aliphatic groups in the composition.

Furthermore, suitable amounts of fillers may be added to the composition of the present invention, for reducing heat shrinkage upon cure, for lowering the thermal expansion coefficient of an elastomer obtained upon curing, for improvements in thermal stability, weatherability, chemical resistance, flame resistance or mechanical strength or for lowering gas permeability. The fillers usable include, for example, fumed silica, quartz powder, glass fibers, carbon, metal oxides such as iron oxide, titanium oxide, cerium oxide, etc. and metal carbonates such as calcium carbonate, magnesium carbonate, etc. If necessary, suitable pigments, dyes or antioxidants can also be compounded in the composition.

Silicone Rubber Composition

The silicone rubber composition of the present invention comprising the components as above can be cured at room temperature, in some cases which depend on the kind of the functional group in the organopolysiloxane of component (A) and the kind of the catalyst of component (C). In general, the composition cures at a temperature of from 100° to 200° C. in a short time ranging from several hours to several minutes, to give a cured product in the form of an rubberlike elastic material. When put to use, the composition may be dissolved in a suitable organic solvent such as toluene, xylene, etc. in a desired concentration, according to the aimed use.

The silicone rubber composition of the present invention gives a cured product in the form of an rubberlike elastic material having high strength and excellent transparency, and is highly suitable for applications such as optical fiber cores, claddings, coating agents, etc. In addition, the silicone rubber composition has characteristic features of ability to form thin films, excellent mold release properties, high insulation resistance and low water absorption, which render the composition applicable to uses such as gas- or liquid-separating films, mold release agents, molding RTV, electrical insulation potting, adhesives, etc. Moreover, the silicone rubber composition of the present invention, having ability to give a cured product with high elongation and strength without addition of fillers, is also suited to high fatigue resistance rubber such as nipples, rubber contacts, etc., fiber-treating agents with high water pressure resistance, and so on.

EXAMPLES

The present invention will be further illustrated by the following nonlimitative examples, in which "parts" means "parts by weight" and the viscosity values are measurements at 25° C.

EXAMPLE 1, COMPARATIVE EXAMPLE 1

A composition A comprising 100 parts of a polysilethylenesiloxane having the following formula:

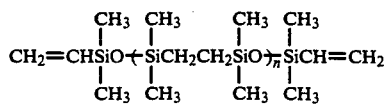

with a viscosity of 4800 cSt and a vinyl group content of 0.009 mole/100 g, 2.5 parts of an organohydrogenpolysiloxane having the following formula:

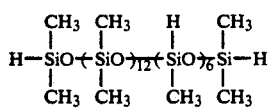

(viscosity: 11 cSt), 0.1 part of a toluene solution of a chloroplatinic acid catalyst modified by

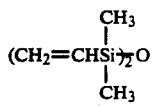

(platinum concentration: 1.0 wt.%) and 0.1 part of

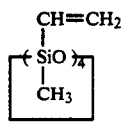

was prepared. The composition A, after vacuum defoaming, was poured into a mold having inside dimensions of 14×17 ×0.20 cm and cured at 100° C. for 60 minutes, to give a transparent elastomer (Example 1).

For comparison, with the same formulation as the composition A except for using a dimethylpolysiloxane blocked by the vinyl group at both ends (viscosity: 5000 cSt) in place of the above polysilethylenesiloxane, a composition B was prepared. The composition B was processed in the same manner as above, to yield a transparent elastomer (Comparative Example 1).

These elastomers were subjected to measurement of physical properties according to JIS K-6301. The results are shown in Table 1.

TABLE 1

| Physical properties | Example 1 Composition A | Comparative Example 1 Composition B |
|---|---|---|
| Specific gravity | 0.91 | 0.99 |
| Hardness | 15 | 20 |
| Elongation (%) | 475 | 180 |
| Tensile strength (kg/cm²) | 36 | 3 |

EXAMPLE 2, COMPARATIVE EXAMPLE 2

A composition C comprising 100 parts of a 20% toluene solution of a transparent polysilethylenesiloxane rubber gum having the following formula:

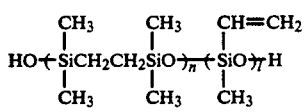

with a vinyl group content of 0.012 mole/100 g and a viscosity (as measured for 10% toluene solution) of 220 cSt, 0.90 part of the same organohydrogenpolysiloxane as used in Example 1, 0.02 part of a 2-ethylhexanol modified chloroplatinic acid catalyst (platinum concentration: 2.0%) and 0.02 part of the same cyclotetrasiloxane as used in Example 1. The composition C was poured into a mold having inside dimensions of 14×17×0.20 cm. The composition in the mold was left to stand for 20 hours at room temperature, to give, through evaporation of solvent, a transparent elastomer sheet. The sheet was removed from the mold and postcured at a temperature of 80° C. for 3 hours (Example 2).

By way of comparison, using the same formulation as above except for replacing the above polysilethylenesiloxane by the same amount of a dimethylpolysiloxane rubber gum blocked by the vinyl group at both ends, a composition D was prepared. In the same manner as above, an elastomer sheet was prepared from the composition D and then postcured (Comparative Example 2).

These postcured sheets were subjected to measurement of physical properties according to JIS K-6301, the results being shown in Table 2.

TABLE 2

| Physical properties | Example 2 Composition C | Comparative Example 2 Composition D |
|---|---|---|
| Hardness | 32 | 35 |
| Elongation (%) | 1160 | 65 |
| Tensile strength (kg/cm²) | 62 | 5.4 |

Besides, the sheet of Example 2 was subjected to measurement of electrical characteristics, to show a volume resistivity of $8.1 \times 10^{17}$ Ωcm, a dielectric constant at 60 Hz of 2.45, and a dielectric loss tangent of $2.1 \times 10^{-4}$.

EXAMPLE 3

One hundred (100) parts of the same polysilethylenesiloxane rubber gum as used in Example 2, 3.9 parts of diphenyldihydroxysilane [Ph₂Si(OH)₂], 3.9 parts of a siloxane having the formula:

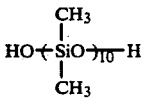

and 41.5 parts of fumed silica (tradename: Aerosil 200, a product by Nippon Aerosil Co. Ltd.) were compounded by a two-roll mill, followed by a heat treatment in a dryer at 120° C. for 2 hours. The resulting compound was masticated by a two-roll mill and then dissolved in toluene, to prepare a 14.9% solution.

One hundred (100) parts of the solution was mixed uniformly with 0.45 part of same the organohydrogenpolysiloxane as used in Example 2, 0.01 part of the same platinum catalyst as used in Example 2 and 0.002 part of 2-ethynylisopropanol, to prepare a composition E.

The composition was poured into a mold with inside dimensions of 14×17×0.20 cm, and left to stand at room temperature for 45 hours, thereby permitting the solvent to evaporate. Then, the composition in the mold was cured at 80° C. for 4 hours and postcured at 100° C. for 2 hours, to give an elastomer sheet. Physical properties of the sheet were measured according to JIS K-6301, the results being shown in Table 3.

TABLE 3

| Physical properties | Example 3 Composition E |
|---|---|
| Hardness | 50 |
| Elongation (%) | 690 |
| Tensile strength (kg/cm²) | 173 |

TABLE 3-continued

| Physical properties | Example 3 Composition E |
|---|---|
| Tear strength A (kg/cm$^2$) | 38 |

We claim:

1. A silicone rubber composition comprising:
(A) an organopolysiloxane which contains an unsaturated aliphatic group and at least 50 mol % of a structural unit having the following general formula [I]:

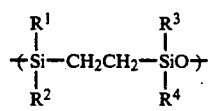

wherein $R^1$ to $R^4$ may be the same or different from each other and each are a substituted or unsubstituted monovalent hydrocarbon group of from 1 to 10 carbon atoms;

(B) an organohydrogenpolysiloxane having at least two Si—H groups in its molecule; and
(C) a platinum family metal catalyst.

2. A cured product obtained by heat curing the silicone rubber composition as defined in claim 1.

3. The composition according to claim 1, wherein the organopolysiloxane (A) has the structural unit of the general formula (I) in which the monovalent hydrocarbon groups $R^1$ to $R^4$ each are a group selected from the group consisting of alkyl, alkenyl, aryl and aralkyl groups and groups derived from these groups by substitution of halogen atoms for part of the hydrogen atoms in these groups.

4. The composition according to claim 1, wherein the organohydrogenpolysiloxane (B) is contained in an amount of from 0.1 to 50 parts by weight per 100 parts by weight of the organopolysiloxane (A).

5. The composition according to claim 4, wherein the organohydrogepolysiloxane (B) is contained in an amount such as to provide from 0.5 to 5 moles of the Si—H groups per mole of the total amount of unsaturated aliphatic groups contained in the composition.

* * * * *

UNITED STATES PATENT AND TRADEMARK OFFICE
CERTIFICATE OF CORRECTION

PATENT NO. : 5,239,034
DATED      : August 24, 1993
INVENTOR(S) : Toshio Takago et al.

It is certified that error appears in the above-indentified patent and that said Letters Patent is hereby corrected as shown below:

On the title page, Item [54] and Column 1, Line 1,

The title, should read: --HIGH-STRENGTH SILICONE RUBBER COMPOSITIONS--

Signed and Sealed this

Fifteenth Day of March, 1994

Attest:

BRUCE LEHMAN

Attesting Officer    Commissioner of Patents and Trademarks